United States Patent
Omori

(10) Patent No.: US 8,944,687 B2
(45) Date of Patent: Feb. 3, 2015

(54) RADIAL FOIL BEARING

(75) Inventor: Naomichi Omori, Tokyo (JP)

(73) Assignee: IHI Corporation (JP)

( * ) Notice: Subject to any disclaimer, the term of this patent is extended or adjusted under 35 U.S.C. 154(b) by 0 days.

(21) Appl. No.: 14/235,817

(22) PCT Filed: Jul. 25, 2012

(86) PCT No.: PCT/JP2012/068841
§ 371 (c)(1),
(2), (4) Date: Jan. 29, 2014

(87) PCT Pub. No.: WO2013/024674
PCT Pub. Date: Feb. 21, 2013

(65) Prior Publication Data
US 2014/0169708 A1 Jun. 19, 2014

(30) Foreign Application Priority Data
Aug. 12, 2011 (JP) ................................. 2011-176757

(51) Int. Cl.
*F16C 17/02* (2006.01)
(52) U.S. Cl.
CPC .................................... *F16C 17/024* (2013.01)
USPC .......................................... 384/103; 384/106
(58) Field of Classification Search
CPC ..................................................... F16C 17/024
USPC .................................................. 384/103, 106
See application file for complete search history.

(56) References Cited

U.S. PATENT DOCUMENTS 3,809,443 A * 5/1974 Cherubim ...................... 384/106
5,902,049 A * 5/1999 Heshmat ...................... 384/106

FOREIGN PATENT DOCUMENTS

| JP | 2001-295836 | 10/2001 |
| JP | 2002-372042 | 12/2002 |
| JP | 2008-200823 | 9/2008 |
| JP | 2009-299748 | 12/2009 |
| JP | 2011-017385 | 1/2011 |
| JP | 2011-033176 | 2/2011 |
| JP | 2012-241775 | 12/2012 |

OTHER PUBLICATIONS

International Search Report and Written Opinion mailed Aug. 28, 2012 in corresponding PCT International Application No. PCT/JP2012/068841.

* cited by examiner

*Primary Examiner* — Thomas R. Hannon
(74) *Attorney, Agent, or Firm* — Ostrolenk Faber LLP

(57) ABSTRACT

The radial foil bearing (3) for supporting a rotary shaft (1) includes a cylindrical top foil (10) disposed to face the rotary shaft (1), a back foil (11) disposed on a radially outer side of the top foil (10), and a cylindrical bearing housing (12) accommodating the top foil (10) and the back foil (11). The back foil (11) is formed in a cylindrical shape using at least one back foil piece (11a). The back foil piece (11a) includes peak portions (11c) and valley portions (11b) which are alternately formed in a circumferential direction of the top foil (10) and is fixed to the bearing housing (12) at an intermediate portion between both end portions in a circumferential direction of the back foil piece.

5 Claims, 5 Drawing Sheets

RADIAL FOIL BEARING

CROSS-REFERENCE TO RELATED APPLICATIONS

The present application is a 35 U.S.C. §§371 national phase conversion of PCT/JP2012/068841, filed Jul. 25, 2012, which claims priority to Japanese Patent Application No. 2011-176757, filed Aug. 12, 2011, the contents of which are incorporated herein by reference. The PCT International Application was published in the Japanese language.

TECHNICAL FIELD

The present invention relates to a radial foil bearing.

BACKGROUND ART

In the related art, as a bearing for a high-speed rotating body, a radial bearing which is used in a state of being attached so as to enclose a rotary shaft is known. As such a radial bearing, a radial foil bearing which includes a thin sheet-shaped top foil which forms a bearing surface, a back foil which elastically supports the top foil, and a cylindrical bearing housing which accommodates the top foil and the back foil is well known. As the back foil of the radial foil bearing, a bump foil in which a thin sheet is shaped into a wave shape and peak portions and valley portions are alternately formed is mainly used.

Generally, in the radial foil bearing, in order to prevent the top foil or the back foil from being detached from the bearing housing, one end portion (toe portion) of the top foil or the bump foil is directly fixed to the bearing housing or is indirectly fixed thereto via a spacer, using spot welding. Moreover, in order to perform mechanical fixation instead of welding, a structure in which one end portion of the top foil or the back foil (bump foil) is bent and the bent portion is engaged with an engagement groove formed in the bearing housing is also known (for example, Japanese Unexamined Patent Application, First Publication No. 2011-033176, and Japanese Unexamined Patent Application, First Publication No. 2011-017385). In this way, the one end portion is fixed using spot welding or engagement, and thus, the one end portion becomes a fixed end (fixed point) and the other end portion thereof becomes a free end.

In the radial foil bearing, when the rotary shaft which is supported by the bearing is rotated, a fluid lubricating film is formed between the top foil and the rotary shaft. At this time, a load acting on the rotary shaft is applied to the top foil through the fluid lubricating film, and thus, the top foil is pushed, and a width of each peak portion of the bump foil (back foil) which receives the load from the top foil is widened. Accordingly, the heights of the peak portions of the bump foil are decreased and bending of the top foil is accepted. That is, the heights of the peak portions of the bump foil are decreased, and thereby a space which can accommodate the bent portions of the top foil is formed. Accordingly, in the radial foil bearing, the shape of the bearing surface thereof is variable, and an appropriate fluid lubricating film is formed according to the load.

Moreover, as described above, when the bump foil receives the load and is deformed, the width of each of the peak portions is widened. At this time, sliding occurs between the bump foil and the top foil or between the bump foil and the bearing housing. Accordingly, when vibration (shaft vibration) occurs in the rotary shaft, vibration energy is dissipated by friction due to sliding, and vibration suppression effects are achieved.

SUMMARY OF INVENTION

Technical Problem

If a bump foil receives a load and is pushed onto a bearing housing, each peak portion slides (is deformed) toward the free end with the fixed end as a starting point while the width of the peak portion is widened. At this time, since the deformation of the peak portion close to the fixed end is restricted by other peak portions which are positioned closer to the free end than the peak portion close to the fixed end, sliding (deformation) does not easily occur. On the other hand, in the peak portion close to the free end, deformation is not further restricted approaching the free end, and thus a sliding amount (deformation amount) is increased.

When the peak portions of the bump foil are not easily deformed in the circumferential direction of the bearing housing, elasticity of the peak portions with respect to the load (the load acting on the rotary shaft) in the radial direction of the bearing housing is increased. On the other hand, when the peak portions of the bump foil are easily deformed in the circumferential direction of the bearing housing, elasticity of the peak portions with respect to the load in the radial direction of the bearing housing is decreased. As a result, a spring constant is increased at a position near the fixed end of the bump foil, and a spring constant is decreased at a position near the free end. Accordingly, when the bump foil is disposed over the entire circumference of the bearing, supporting rigidity of the top foil is increased at a position near the fixed end of the bump foil, and supporting rigidity of the top foil is decreased at a position near the free end of the bump foil.

If the bump foil has a portion of low supporting rigidity, a film pressure which is generated over the entire circumference of the bearing is decreased, and a portion having a thin film thickness may locally occur. Accordingly, load capability of the bearing may be decreased, or deviation in bearing rigidity (shaft supporting rigidity of an entire bearing including the fluid lubricating film) may occur. In addition, if the bump foil has a portion of high supporting rigidity, the sliding amount is decreased, damping effects (vibration suppression effects which are obtained by dissipating the vibration energy by the friction due to the sliding) are reduced, and the damping capability (vibration suppression capability) of the entire bearing may be decreased.

Accordingly, in order to equalize the supporting rigidity and sliding characteristics of the bump foil over the entire circumference of the bearing, it is considered that the bump foil is divided in the circumferential direction and thereby a difference between the fixed end and the free end in the above-described characteristics is decreased. However, if the number of division is increased, the number of the bump foils (back foils) is increased, and the fixed points are also increased, which are not preferable in the manufacturing and the cost. Particularly, when the fixation of the bump foil is performed using welding, if all locations to be welded are not properly welded, the bearing cannot be delivered as a product, and thus, quality maintenance may become difficult, and the manufacturing cost may be increased due to efficiency percentage dropping.

The present invention is made in consideration of the above-described circumstances, and an object thereof is to provide a radial foil bearing which decreases a difference in supporting rigidity generated between a fixed end and a free end of a back foil and which has a larger load capability of the bearing, high bearing rigidity, and a high damping capability.

Solution to Problem

According to a first aspect of the present invention, a radial foil bearing for enclosing and supporting a rotary shaft includes a cylindrical top foil disposed so as to face the rotary shaft; a back foil disposed on a radially outer side of the top foil; and a cylindrical bearing housing accommodating the top foil and the back foil. The back foil is formed in a cylindrical shape using at least one back foil piece. In addition, the back foil piece includes peak portions and valley portions which are alternately formed in a circumferential direction of the top foil and is fixed to the bearing housing at an intermediate portion between both end portions in a circumferential direction of the back foil piece.

In the radial foil bearing, the back foil is formed in a cylindrical shape using at least one back foil piece. In addition, the back foil piece includes peak portions and valley portions which are alternately formed in the circumferential direction of the top foil and is fixed to the bearing housing at the intermediate portion between both end portions in the circumferential direction of the back foil piece. Accordingly, compared to a case where one end portion of a foil is fixed to a bearing housing as in the related art, a distance between a fixed end (fixed portion) and a free end (end portion of back foil) is approximately halved. Therefore, restriction due to the peak portions positioned near the free end is decreased, the peak portions positioned near the fixed end easily slides (is easily deformed), and thus, a difference in supporting rigidity between the free end and the fixed end is sufficiently decreased.

In addition, according to a second aspect of the present invention, in the first aspect, the back foil is formed in a cylindrical shape using back foil pieces which are disposed in line in the circumferential direction of the top foil.

In this case, unlike a case where the back foil is formed of a single back foil piece over the entire circumference of the top foil, the back foil is composed of the back foil pieces which are disposed in line in the circumferential direction of the top foil, and thus, each back foil piece is disposed so as to divide the entire circumference of the top foil. Accordingly, in the back foil piece, the distance between the fixed end and the free end is decreased. Therefore, the difference in supporting rigidity between the free end and the fixed end is decreased.

In addition, each back foil piece is fixed to the bearing housing at the intermediate portion of each back foil piece in the circumferential direction of the top foil. Accordingly, compared to a case where one end portion of the back foil piece is fixed to the bearing housing, the distance between the fixed end (fixed portion) and the free end (end portion of back foil) is approximately halved. Therefore, restriction due to the peak portions positioned near the free end is decreased, the peak portions positioned near the fixed end easily slides (is easily deformed), and thus, a difference in supporting rigidity between the free end and the fixed end is sufficiently decreased.

Moreover, according to a third aspect of the present invention, in the first or the second aspect, the back foil piece is fixed to the bearing housing using spot welding.

When the fixation of the bump foil is performed using spot welding, if all locations to be welded are not properly welded, the bearing cannot be delivered as a product, and thus, quality maintenance may become difficult, and efficiency percentage may drop.

For example, in the related art, when the number of divisions in the circumferential direction of the back foil is set to M, the number of the fixed points becomes M with respect to M back foil pieces. On the other hand, in the present invention, the back foil piece is fixed at the intermediate portion in the circumferential direction of the back foil piece using spot welding. Accordingly, the number of divisions in the circumferential direction of the back foil is set to M/2, and the length of the back foil piece is lengthened twice, whereby the substantial number of the divisions in the circumferential direction can be M. That is, the number of the back foil pieces becomes half (M/2), and the number of the fixed points is reduced by half. Accordingly, compared to a case where the back foil is divided in the circumferential direction using the configuration which is the same as the related art, since the number of the fixed points (the number of welded points) can be halved, manufacturing man-hours are decreased, reduction in cost is improved, and stabilization of quality can be improved.

Effects of Invention

According to a radial foil bearing of the present invention, by fixing at least one back foil piece at the intermediate portion thereof, the difference in supporting rigidity between a free end and a fixed end can be sufficiently decreased. Therefore, a larger load capability, high bearing rigidity, and a high damping capability of the radial foil bearing can be obtained.

DESCRIPTION OF EMBODIMENTS

Figure 1:
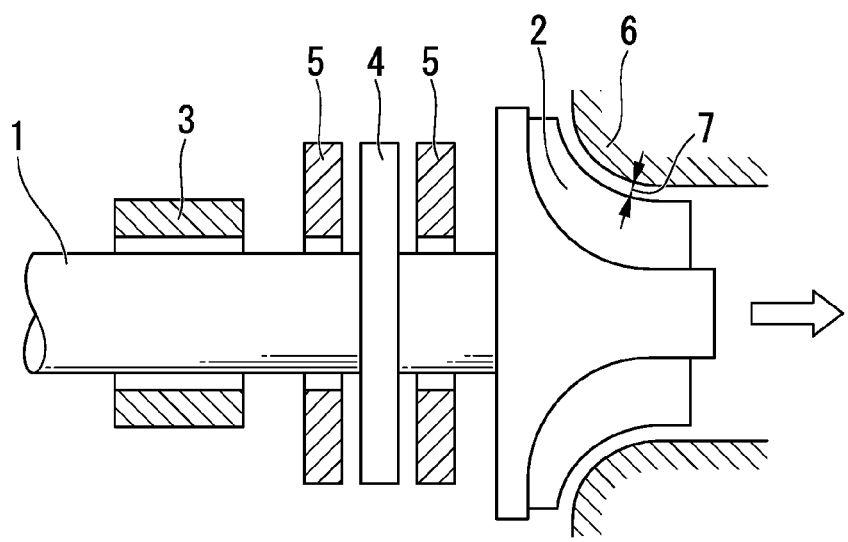
FIG. 1 is a schematic view showing an example of a turbo machine to which a radial foil bearing according to a first embodiment of the present invention is applied.

Hereinafter, a radial foil bearing of the present invention will be described in detail with reference to the drawings. Moreover, in order to show each member in a recognizable size in the drawings below, a scale of each member is appropriately changed.

(First Embodiment)

FIG. 1 is a side view showing an example of a turbo machine to which a radial foil bearing of a first embodiment of the present invention is applied. In FIG. 1, a reference numeral 1 indicates a rotary shaft, a reference numeral 2 indicates an impeller provided in a tip portion of the rotary shaft, and a reference numeral 3 indicates the radial foil bearing according to the present invention. Moreover, in FIG. 1, only one radial foil bearing is shown while another radial foil bearing is omitted. However, in general, two radial foil bearings are provided in the axial direction of the rotary shaft 1, and thus, a support structure for the rotary shaft 1 is configured. Accordingly, although it is not shown, also in the present embodiment, two radial foil bearings 3 are provided. However, the radial foil bearing 3 of the present invention can be also applied to a configuration in which only one radial foil bearing is provided on the rotary shaft.

In the rotary shaft 1, a thrust collar 4 is fixed to a side on which the impeller 2 is formed. On each of both sides of the thrust collar 4, a thrust bearing 5 is disposed so as to face the thrust collar 4.

In addition, the impeller 2 is disposed inside a housing 6 which is a stationary side, and a tip clearance 7 is provided between the impeller 2 and the housing 6.

Moreover, the radial foil bearing 3 is attached so as to enclose the rotary shaft 1 at a position nearer the center of the rotary shaft 1 than the thrust collar 4.

Figure 2A:
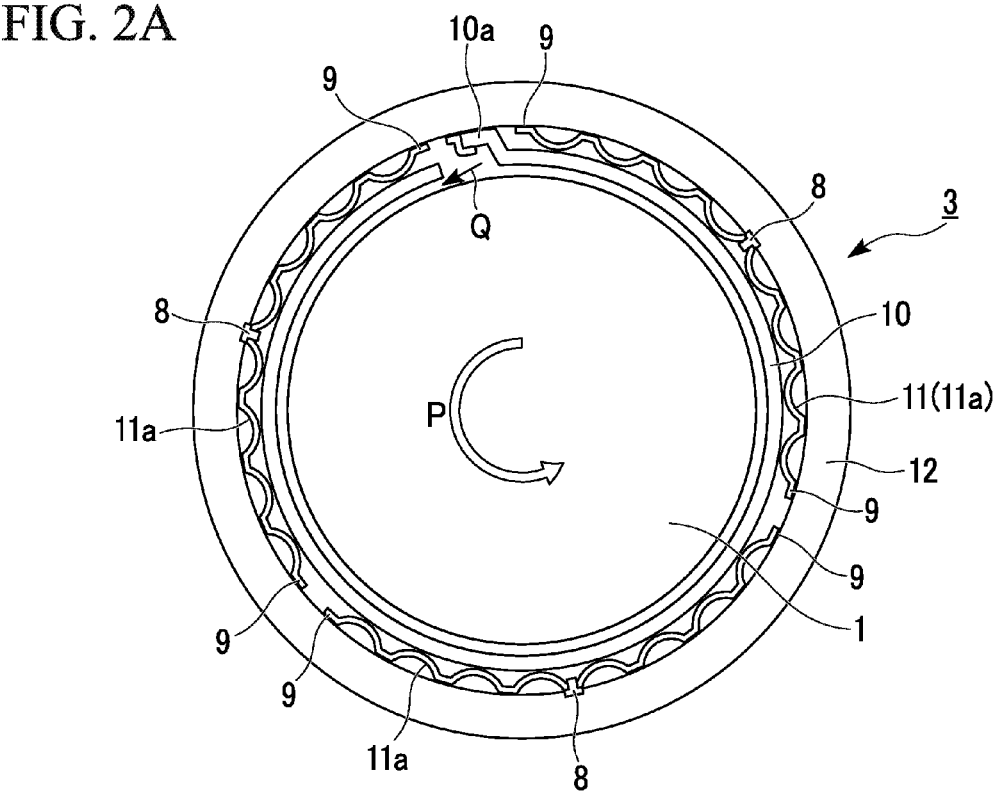
FIG. 2A is a side view showing a schematic configuration of the radial foil bearing according to the first embodiment of the present invention.
Figure 2B:
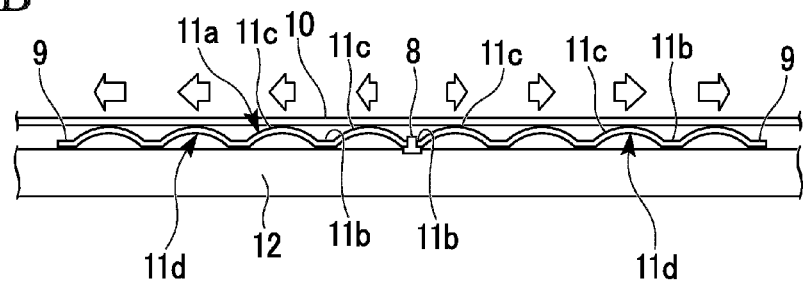
FIG. 2B is a side view in which a main section of FIG. 2A is flattened and is schematically shown.
Figure 2C:
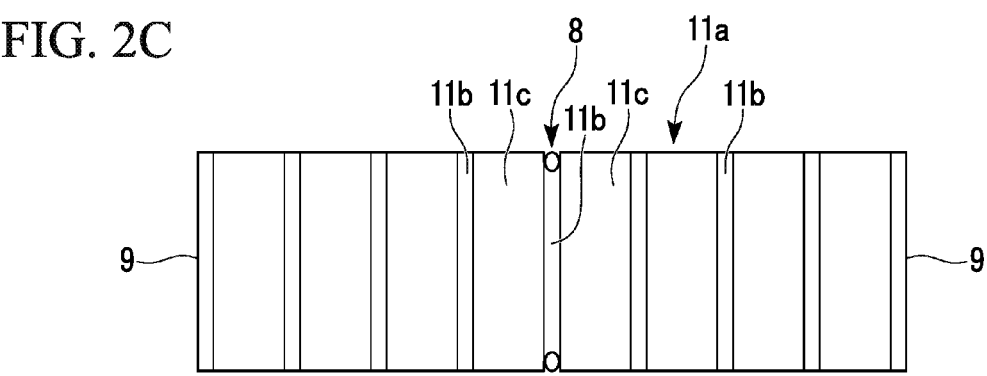
FIG. 2C is a plan view in which a main section of FIG. 2A is flattened and is schematically shown.

FIGS. 2A to 2C are views showing the first embodiment of the radial foil bearing which is applied to the turbo machine having the above-described configuration. As shown in FIG. 2A, the radial foil bearing 3 of the present embodiment is formed in a cylindrical shape which encloses the rotary shaft 1 and supports the rotary shaft 1. The radial foil bearing 3 includes a cylindrical top foil 10 which is disposed so as to face the rotary shaft 1, a back foil 11 which is disposed on the radially outer side of the top foil 10, and a bearing housing 12 which is disposed on the radially outer side of the back foil 11.

The bearing housing 12 composes the outermost portion of the radial foil bearing 3 and is formed in a cylindrical shape using metal. The bearing housing 12 accommodates the back foil 11 and the top foil 10 in the inside of the bearing housing.

The back foil 11 is formed of a foil (thin sheet) and elastically supports the top foil 10. As the back foil 11, for example, a bump foil, a back foil which is described in Japanese Unexamined Patent Application, First Publication No. 2009-299748, or the like is used. In the present embodiment, the bump foil is used as the back foil 11. However, the above-described back foil may be used as the back foil of the present invention.

As shown in FIG. 2A, the back foil 11 (bump foil) of the present embodiment is formed in a cylindrical shape using three back foil pieces 11a which are disposed in line in the circumferential direction of the top foil 10. The back foil piece 11a is configured so that a foil (thin sheet) is shaped into a wave shape and the entire side surface of the back foil piece is formed into an arc shape. All three back foil pieces 11a are formed so as to have the same shape and size. Accordingly, the back foil pieces 11a are disposed so as to approximately divide the inner circumferential surface of the bearing housing 12 in three.

Moreover, a pair of back foil pieces 11a, which are positioned so that a fixed end 10a of the top foil 10 described below is interposed therebetween, are disposed with a gap to some extent. On the other hand, in positions other than the interposed position, mutual end portions are disposed to be close to each other in a pair of adjacent back foil pieces 11a. According to the configuration, the three back foil pieces 11a are formed into an approximately cylindrical shape as a whole and are disposed along the inner circumferential surface of the bearing housing 12.

Moreover, as shown in FIG. 2B of a side view and in FIG. 2C of a plan view, in which a main section of FIG. 2A is flattened and is schematically shown, the back foil piece 11a shaped into a wave shape as described above includes flat (along the inner circumferential surface of the bearing housing 12) valley portions 11b contacting the bearing housing 12 and curved (curved so as to protrude toward the radially inner side) peak portions 11c contacting the top foil 10, which are alternately formed in the circumferential direction of the bearing housing 12. Accordingly, as shown in FIG. 2B, the back foil pieces 11a elastically support the top foil 10 through the peak portions 11c contacting the top foil 10. Moreover, fluid passages which extend in a central axial direction of the radial foil bearing 3 are formed by the peak portions 11c or the valley portions 11b.

Moreover, for example, when a bearing diameter (inner diameter) of the radial foil bearing 3 is 35 mm, the back foil piece 11a is formed so that a thickness of the back foil piece is approximately 100 μm, a width (a width in the circumferential direction of the radial foil bearing 3) of the peak portion 11c is approximately 3 mm, and a height of the peak portion 11c is approximately 0.6 mm. Moreover, a thickness of the top foil 10 described below is approximately 100 μm.

Each back foil piece 11a is fixed to the bearing housing 12 using spot welding at a center portion in the circumferential direction of the back foil piece, that is, in the circumferential direction of the top foil 10. The spot welding is performed on the valley portion 11b (a flat portion which is formed between peak portions 11c and 11c) which is positioned at the center portion of the back foil piece 11a. As shown in FIG. 2C, with respect to the location at which the spot welding is performed, the spot welding is performed at two locations of the valley portion 11b of the center portion in one back foil piece 11a, that is, at edges on both sides in the axial direction (the central axial direction of the radial foil bearing 3) of the back foil piece 11a. Accordingly, in the valley portion 11b, one welded point in the appearance as shown in FIG. 2B is formed, that is, fixed points 8 are formed by spot welding at two locations. Moreover, since the fixed points 8 are formed at the center portion of the back foil piece 11a, both ends of the back foil piece 11a become free ends 9.

That is, in one back foil piece 11a, a back foil portion 11d which is positioned between the fixed points 8 functioning as the fixed end, and one free end 9, and a back foil portion 11d which is positioned between the fixed points 8 and the other free end 9 are formed.

In this way, two back foil portions 11d are formed in one back foil piece 11a. Accordingly, as described below, one back foil piece 11a in the present embodiment has the same function as a structure having two back foil pieces in the related art.

As shown in FIG. 2A, the top foil 10 is wound into a cylindrical shape along the inner surface of the back foil 11 which is composed of three back foil pieces 11a. In the top foil 10, one end portion is fixed to the bearing housing 12 using spot welding and becomes the fixed end 10a, and the other end portion becomes a free end.

Next, operations of the radial foil bearing 3 having the above-described configuration will be described.

In a state where the rotary shaft 1 stops, the top foil 10 is pressed onto the rotary shaft 1 by the back foil 11 (three back foil pieces 11a) and thus tightly contacts the rotary shaft 1.

If the rotary shaft 1 is rotated in the direction of an arrow P of FIG. 2A, at first, the rotary shaft 1 is rotated at a low speed, and thereafter, is gradually accelerated and rotated at a high speed. At this time, as shown by an arrow Q of FIG. 2A, an ambient fluid is led from a space between the fixed end 10a of the top foil 10 and one end of the back foil piece 11a, and the ambient fluid flows into a space between the top foil 10 and the rotary shaft 1. Accordingly, a fluid lubricating film is formed between the top foil 10 and the rotary shaft 1.

Film pressure of the fluid lubricating film acts on the top foil 10, and each peak portion 11c of the back foil pieces 11a contacting the top foil 10 is pressed toward a radially outer side. The back foil pieces 11a are pressed by the top foil 10, and thus, the peak portions 11c are pressed and widened. Accordingly, the back foil pieces 11a move in the circumferential direction on the bearing housing 12.

That is, in the back foil piece 11a which receives a load from the top foil 10 through the fluid lubricating film, as shown by arrows of FIG. 2B, a width of each peak portion 11c is widened. Accordingly, the heights of the peak portions 11c in the back foil piece 11a are decreased, and bending of the top foil 10 is accepted. That is, since the heights of the peak portions 11c are decreased, spaces which can accommodate bent portions of the top foil 10 are formed inside the bearing housing 12. Accordingly, in the radial foil bearing 3, the shape of the bearing surface is variable, and an appropriate fluid lubricating film is formed according to the load.

Moreover, as described above, when the back foil piece 11a receives the load and is deformed, the widths of the peak portions 11c are widened. At this time, sliding is generated between the back foil pieces 11a and the top foil 10 or between the back foil pieces 11a and the bearing housing 12. Accordingly, when vibration (shaft vibration) occurs in the rotary shaft 1, vibration energy is dissipated by friction due to sliding, and vibration suppression effects are achieved.

Moreover, the deformation (movement) in the circumferential direction of the back foil piece 11a is influenced by the friction between the back foil piece 11a and the top foil 10 or between the back foil piece 11a and the bearing housing 12. Accordingly, as shown by the sizes of arrows in FIG. 2B, the back foil piece 11a is easily deformed (easily moves) at both end portions, that is, at a position near each free end 9, but is not easily deformed at a position near the fixed point 8. Accordingly, a difference in supporting rigidity of the back foil piece 11a occurs between the free end 9 and the fixed point 8.

Figure 3A:
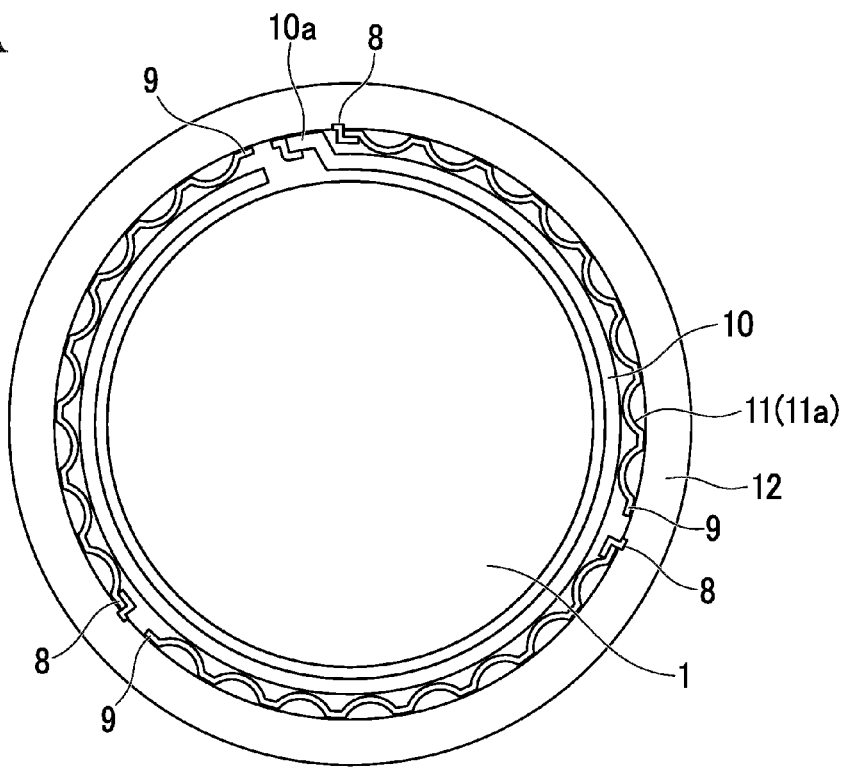
FIG. 3A is a side view of a radial foil bearing in the related art.
Figure 3B:
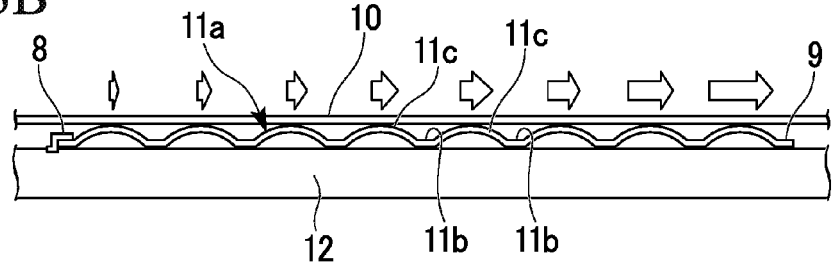
FIG. 3B is a side view in which a main section of FIG. 3A is flattened and is schematically shown.

However, compared to a configuration of the related art in which one end portion of the back foil piece 11a is fixed using spot welding as shown in FIGS. 3A and 3B, in the present embodiment, since the fixed point 8 formed by spot welding is provided at the center portion in the circumferential direction of the back foil piece 11a, a distance between the fixed end (fixed point 8) and the free end (the end portion of the back foil, that is, the free end 9) is approximately halved. Accordingly, the restriction due to the peak portions 11c positioned near the free end 9 is decreased, the peak portions 11c which are positioned near the fixed point 8 (fixed end) easily slides (is easily deformed), and thus the difference in supporting rigidity between the free end 9 and the fixed point 8 (fixed end) is sufficiently decreased.

Moreover, in this way, since the fixed point 8 is formed at the center portion of the back foil piece 11a, both end portions of the back foil piece 11a become the free ends 9. Accordingly, two back foil portions 11d are formed in one back foil piece IIa, and one back foil piece 11a of the present embodiment has the same function as the structure having two back foil pieces in the related art. That is, the radial foil bearing 3 of the present embodiment includes three back foil pieces 11a, and thereby the radial foil bearing 3 has the same function as the radial foil bearing having six back foil pieces 40a in the related art shown in FIG. 3C.

Figure 3C:
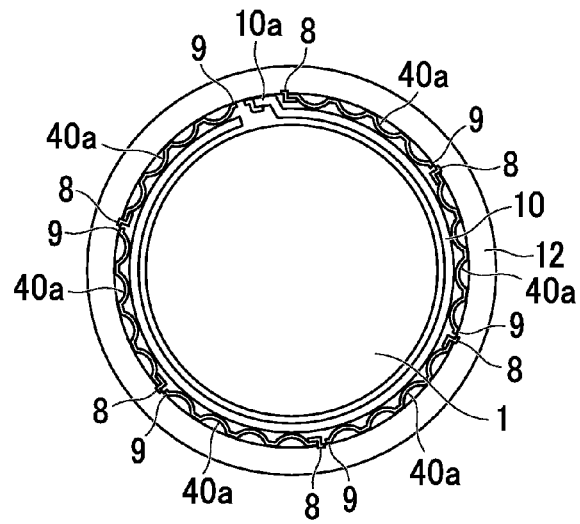
FIG. 3C is a side view of another radial foil bearing in the related art.

In the related art shown in FIG. 3C, when the number of division in the circumferential direction of the back foil is set to six, the number of the fixed points 8 with respect to six back foil pieces 40a becomes six. On the other hand, in the radial foil bearing 3 of the present embodiment, the back foil piece 11a is fixed at the center portion thereof in the circumferential direction using spot welding. Accordingly, the number of division in the circumferential direction of the back foil 11 is set to three, and the length of the back foil piece 11a is extended twice, whereby the substantial number of division in the circumferential direction can be set to six.

As described above, in the radial foil bearing 3 of the present embodiment, the back foil 11 is composed of three back foil pieces 11a which are disposed in line in the circumferential direction of the top foil 10. Compared to a case where the back foil 11 is formed of a single foil over the entire circumference of the top foil 10, since each back foil piece 11a is disposed so as to divide the entire circumference of the top foil 10, the distance between the fixed end and the free end in the back foil piece is shortened. Therefore, in the radial foil bearing 3, the difference in supporting rigidity between the free end and the fixed end is decreased. Moreover, since the back foil piece 11a is fixed at the center portion thereof, the difference in supporting rigidity between the free end and the fixed end is further decreased. Accordingly, as described above, since the difference in supporting rigidity between the free end and the fixed end is sufficiently decreased, a larger load capability of the bearing, high bearing rigidity, and a high damping capability can be obtained in the radial foil bearing 3.

Moreover, the present invention is not limited to the above-described embodiment and is limited only by the scope of the attached claims. A shape, combination or the like of each component shown in the above-described embodiment is an example, and any addition, omission, replacement, and other modifications in configurations can be performed within a scope which does not depart from the gist of the present invention.

For example, in the above-described embodiment, the back foil 11 is configured using three back foil pieces 11a. However, the back foil 11 may be shaped into an approximately cylindrical shape using one sheet of metal foil (single back foil piece). Also in this case, the back foil 11 (single back foil piece) is fixed at the center portion thereof, and thus, the difference in supporting rigidity of the free end and the fixed end can be decreased.

Moreover, when the back foil 11 is composed of a plurality of back foil pieces 11a, the number of the back foil pieces is not limited to three. That is, the back foil 11 may be composed of two or four or more back foil pieces 11a.

In addition, in the above embodiment, the back foil 11 (back foil pieces 11a) is fixed to the bearing housing 12 using spot welding. However, the back foil 11 may be fixed using fixing means other than spot welding.

Moreover, the back foil piece 11a of the present embodiment is fixed to the bearing housing 12 at the center portion in the circumferential direction of the back foil piece. However, according to the gist of the present invention in which the length from the fixed point of the back foil piece to the free end thereof is further shortened than in the related art, it is not necessarily to provide the fixed point at the center portion in the circumferential direction of the back foil piece, and the back foil piece may be fixed to the bearing housing at an intermediate portion between both end portions in the circumferential direction of the back foil piece. For example, the back foil piece may be fixed to the bearing housing at a fixed point in which a ratio of a length between the fixed point and one free end to a length between the fixed point and the other free end is 1 to 2.

(Second Embodiment)

FIGS. 4A to 4E show a radial foil bearing in a second embodiment of the present invention. FIGS. 4A to 4E are views showing a radial foil bearing 20 in which the back foil 11 (back foil pieces 11a) is fixed using a locking member 30 as fixing means other than spot welding.

Figure 4A:
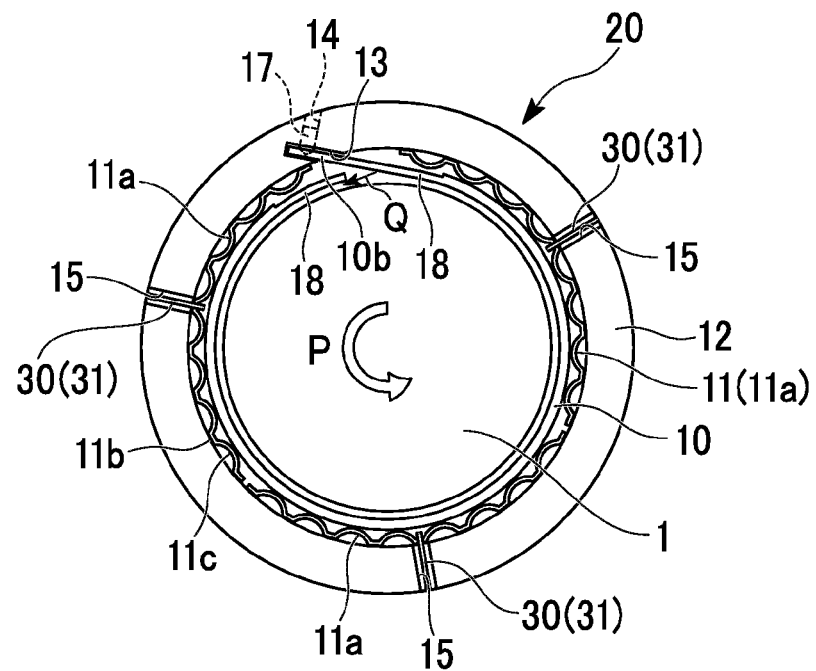
FIG. 4A is a side view showing a schematic configuration of a radial foil bearing according to a second embodiment of the present invention.

As shown in FIG. 4A, the radial foil bearing 20 is configured to include a cylindrical top foil 10 which is disposed so as to face a rotary shaft 1, a back foil 11 which is disposed on the radially outer side of the top foil 10, and a bearing housing 12 which is disposed on the radially outer side of the back foil 11.

A groove 13 is formed on the inner circumferential surface of the bearing housing 12 of the present embodiment in the axial direction of the bearing housing 12.

That is, the groove 13 is formed over the entire length in the axial direction of the bearing housing 12. The groove 13 is formed so that the depth direction thereof corresponds to a direction in which one end portion of the top foil 10 extends out. In addition, the depth of the groove 13 is approximately 2 mm to 5 mm.

Two holes 14 which communicate with the groove 13 are formed on the outer circumferential surface of the bearing housing 12. As described below, the holes 14 are holes into which male screws are inserted, and the male screws are used to fix one end portion 10b of the top foil 10 which is inserted into the groove 13, to the groove 13. Female threaded portions are formed on the inner circumferential surfaces of the holes 14.

Figure 4B:
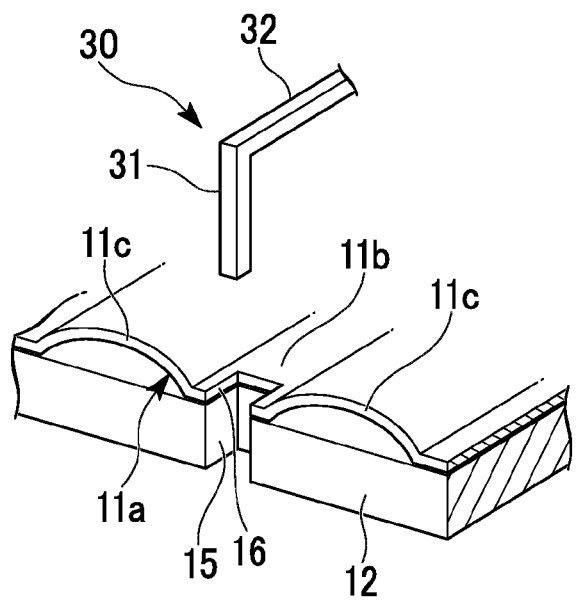
FIG. 4B is a perspective view showing a main section of the radial foil bearing.

As shown in FIGS. 4A and 4B, engagement grooves 15, which extend from an outer circumferential edge to an inner circumferential edge of the bearing housing 12, are formed on each of both side surfaces (side surfaces on both sides in the central axial direction) of the bearing housing 12. As shown in FIG. 4A, the engagement groove 15 of the present embodiment is formed at each of positions in which the side surface of the bearing housing 12 is approximately divided in three in the circumferential direction. Locking members 30 are locked into the engagement grooves 15. Moreover, in the present embodiment, the groove 13 is disposed between two engagement grooves 15 among three engagement grooves 15.

Similar to the first embodiment, the back foil 11 is configured using three back foil pieces 11a which are disposed in line in the circumferential direction of the top foil 10. The pair of back foil pieces 11a, which are positioned so that the groove 13 is interposed therebetween, are disposed with some gaps. On the other hand, at positions except for the interposed position of the groove, mutual end portions are disposed so as to be close to each other in a pair of back foil pieces 11a which are adjacent to each other. According to the configuration, the three back foil pieces 11a are formed in an approximately cylindrical shape as a whole, and are disposed along the inner circumferential surface of the bearing housing 12.

Figure 4C:
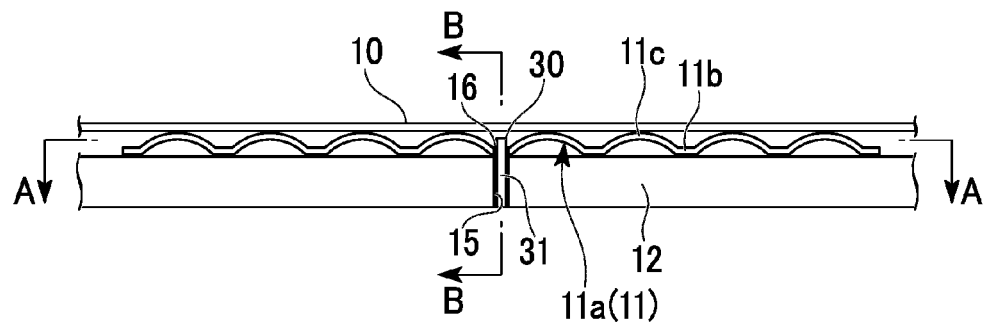
FIG. 4C is a side view in which a main section of FIG. 4A is flattened and is schematically shown.

As shown in FIG. 4C in which a main section of FIG. 4A is flattened and is schematically shown, each of the back foil pieces 11a includes flat valley portions 11b contacting the bearing housing 12 and curved peak portions 11c contacting the top foil 10 which are alternately formed in the circumferential direction of the bearing housing 12.

Figure 4D:
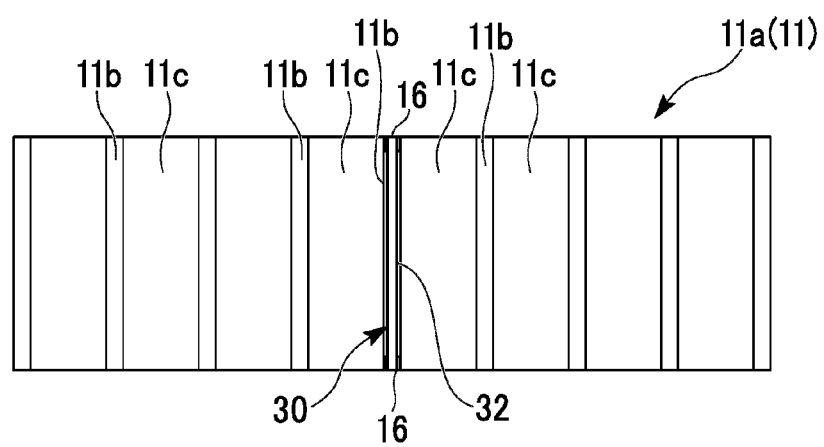
FIG. 4D is a cross-sectional view along an A-A line of FIG. 4C.

As shown in FIG. 4D which is a cross-sectional view along an A-A line in FIG. 4C, in each of the back foil pieces 11a, notches 16 are formed in both edge portions (edge portions on both sides in the axial direction) of the circumferentially center portion thereof (the center portion in the circumferential direction of the bearing housing 12). As shown in FIG. 4B, the notches 16 are formed in the valley portion 11b of the back foil piece 11a. The valley portion 11b which is a flat portion formed between the peak portions 11c and 11c is notched from both edge portions in the axial direction of the bearing housing 12 toward the center portion in the axial direction, and thus, the notches 16 are formed. The notch 16 is formed at a position corresponding to the engagement groove 15 of the bearing housing 12, that is, at a position which overlaps with the engagement groove 15, and the width (the width in the circumferential direction of the bearing housing 12) and the depth (the depth in the axial direction of the bearing housing 12) of the notch 16 are formed to be the same as the width and the depth of the engagement groove 15, respectively.

According to the above-described configuration, as shown in FIG. 4B, the engagement groove 15 of the bearing housing 12 and the notch 16 of the back foil piece 11a function as one groove. Moreover, in order to prevent the occurrence of burring and distortion due to stress in the notch 16, it is preferable that the notch 16 be formed through performing etching processing or electro discharge machining on a foil. That is, after the notches 16 are formed in a foil using etching processing or electro discharge machining, it is preferable that the back foil piece 11a be formed through performing press molding on the foil to form peak portions 11c or valley portions 11b.

Figure 4E:
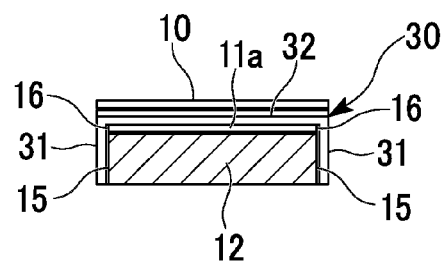
FIG. 4E is a cross-sectional view along a B-B line of FIG. 4C.

The locking member 30 is locked into the engagement grooves 15 and the notches 16. As shown in FIG. 4E which is a cross-sectional view along a B-B line in FIG. 4C and as shown in FIG. 4B, the locking member 30 is formed in a U-shape which includes a pair of engagement legs 31 and 31, and a connection portion 32 which connects the engagement legs 31 and 31 together so as to be disposed at one ends of the engagement legs 31 and 31. One engagement leg 31 engages with the engagement groove 15 and the notch 16 of one side surface of the radial foil bearing 3, and the other engagement leg 31 engages with the engagement groove 15 and the notch 16 of the other side surface of the radial foil bearing 3. As shown in FIGS. 4C and 4E, the length of the engagement leg 31 is approximately the same as a sum of the thickness (the thickness in the radial direction) of the bearing housing 12 and the thickness of the back foil piece 11a. Moreover, as shown in FIGS. 4C to 4E, the connection portion 32 is disposed between the valley portion 11b of the back foil piece 11a and the top foil 10.

In the locking member 30 having the above-described configuration, since the engagement leg 31 engages with both of the engagement groove 15 of the bearing housing 12 and the notch 16 of the back foil piece 11a, the locking member 30 functions as fixing means to fix the back foil piece 11a to the bearing housing 12. In addition, since the connection portion 32 is covered by the top foil 10, detachment of the locking member 30 from the bearing housing 12 and the back foil piece 11a is prevented. Accordingly, the back foil piece 11a is securely fixed to the bearing housing 12.

The shape of the engagement leg 31 or the connection portion 32 of the locking member 30 may be a square pole shape as shown in FIG. 4B, or may be a cylindrical shape (a round bar shape). Moreover, the thickness of the locking member is approximately 0.2 mm to 0.5 mm. For example, when the bearing size of the radial foil bearing 3 is (the diameter) 35 mm×(the length in the axial direction) 35 mm, both of the thicknesses of the back foil piece 11a and the top foil 10 is approximately 100 μm, and the height of the peak portion 11c (the height with respect to the valley portion 11b) of the back foil piece 11a is approximately 0.5 mm. Accordingly, as shown in FIG. 4C, by setting the thickness of the locking member 30 to be less than 0.5 mm (approximately 0.2 mm to 0.5 mm), the connection portion 32 of the locking member 30 is disposed so as to be separated from the top foil 10, and contacting and interference of the connection portion 32 with respect to the top foil 10 are prevented.

For example, the locking member 30 can be formed by performing etching processing on a metal foil which is formed of stainless steel or the like having a thickness less than 0.5 mm, into a U-shape. Moreover, the locking member 30 can also be formed by bending a wire-like metal bar having a thickness less than 0.5 mm.

As shown in FIG. 4A, the top foil 10 is wound into a cylindrical shape along the inner surface of the back foil 11 which is composed of three back foil pieces 11a. The top foil 10 is disposed so that the tip of one end portion 10b engages with the groove 13 formed in the bearing housing 12.

A rectangular metal foil, in which a long side thereof is in a circumferential direction of the bearing and a short side thereof is in a central axial direction of the bearing, is wound in a cylindrical shape around the central axis, and thus, the top foil 10 is formed.

The top foil 10 is not wound so that both ends of the metal foil butt against each other, and is wound so that the one end portion 10b overlaps with the outside of the other end portion. In addition, the one end portion 10b is formed so as to extend out in a tangential direction at a predetermined position of a cylinder portion which is formed on the portion other than the overlapping portion.

Moreover, the groove 13 of the bearing housing 12 is formed so that the depth direction thereof corresponds to the extending direction of the one end portion 10b of the top foil 10.

Accordingly, the top foil 10 is disposed so that the extending direction of the one end portion 10b corresponds to the depth direction of the groove 13, and the tip of the one end portion 10b engages with the groove 13. Since the top foil 10 is not deformed in the state where the one end portion 10b engages with the groove 13, the occurrence of distortion in the top foil 10 is prevented.

In the present embodiment, the one end portion 10b of the top foil 10 which engages with the groove 13 is fixed into the groove 13 by male screws 17. That is, the male screws 17 are screwed and inserted into the holes 14, the one end portion 10b is pressed by the male screws 17, to tightly contact the inner wall surface of the groove 13, and thus, the one end portion 10b is fixed into the groove 13. Moreover, the deformation of the one end portion 10b due to tightly contacting the inner wall surface of the groove 13 is slight. Accordingly, the distortion of the top foil 10 due to the deformation hardly occurs.

A thin portion 18, which is thinner than an intermediate portion between the one end portion 10b and the other end portion opposite to the one end portion in the top foil 10, is formed in each of the one end portion 10b and the other end portion. The thin portions 18 are formed to be thinned to be in a state where the outer circumferential surfaces thereof (surfaces near the back foil 11) are depressed further than the outer circumferential surface of the intermediate portion.

The thin portions 18 are formed through, for example, etching processing in which both ends of the top foil 10 are controlled to several tens of micrometers and are formed in a desired thickness (thinness). Specifically, when a bearing diameter is set to 35 mm, if the thickness of the top foil 10 is set to 100 μm, the thickness of the thin portion 18 is approximately 80 μm. In addition, compared to bending or the like, in the etching processing, stress occurring in the top foil 10 is significantly small. Accordingly, distortion due to the processing hardly occurs in the top foil 10.

Moreover, for example, a length in the circumferential direction of the thin portion 18 is a length corresponding to a distance from the groove 13 to one peak portion 11c of the end portion of the back foil 11 which is positioned near the groove 13.

In this way, by forming the thin portions 18 on both end portions of the top foil 10, both end portions (thin portions 18) are easily deformed elastically. Therefore, both end portions become curved surfaces according to the curved surfaces composing the inner circumferential surface of the bearing housing 12. Accordingly, a force (local preload) clamping the rotary shaft 1 hardly occurs also at both ends of the top foil 10.

In addition, the thin portions 18 are formed to be thinned to be in the state where the outer circumferential surfaces of both end portions of the top foil 10 are depressed further than the outer circumferential surface of the intermediate portion. Accordingly, a gap is formed within an area corresponding to one peak portion 11c of each end portion of the back foil 11, between each thin portion 18 and the back foil 11 supporting the outer circumferential surface of the top foil 10. Accordingly, in the thin portions 18, the occurrence of the force (local preload) clamping the rotary shaft 1 can be securely prevented.

Also in the radial foil bearing 20, since the back foil 11 is formed of the plurality of back foil pieces 11a, the distance between the fixed end (locking position by the locking member 30) in the back foil piece 11a and the free end (both end portions of the back foil piece 11a) is shortened, and thus, the difference in supporting rigidity can be decreased. Moreover, the back foil piece 11a is fixed to the bearing housing 12 at the center portion of the back foil piece, and thus, the difference in supporting rigidity of the free end and the fixed end can be sufficiently decreased. As a result, in the radial foil bearing 20, a larger load capability of the bearing, high bearing rigidity, and a high damping capability can be obtained.

Moreover, when the locking member 30 is used, the engagement leg 31 engages with the notch 16 of the back foil piece 11a and the engagement groove 15 of the bearing housing 12, and thus, the back foil piece 11a (back foil 11) is fixed to the bearing housing 12. Accordingly, the back foil piece 11a can be accommodated into and fixed to the bearing housing 12 without performing spot welding or bending with respect to the back foil piece 11a. Therefore, the occurrence of distortion in the top foil 10 due to influences of spot welding of the back foil 11 (back foil piece 11a) or of distortion of the back foil 11 can be prevented, or distortion in the top foil 10 can be sufficiently decreased. Accordingly, the designed favorable performance with respect to a load capability or dynamic characteristics (rigidity and damping) of the bearing can be achieved.

In addition, in the back foil 11, since spot welding or bending, which may generate distortion, of the related art can be omitted, difficulty of the manufacturing is decreased, and the manufacturing cost can be reduced. In addition, since special bending is unnecessary in the back foil 11, the back foil 11 can be press-molded with high accuracy.

Moreover, the back foil 11 (back foil pieces 11a) may be fixed to the bearing housing 12 using fixing means other than spot welding or the locking member 30.

Industrial Applicability

The present invention can be widely used in a radial foil bearing for enclosing and supporting a rotary shaft.

The invention claimed is:

1. A radial foil bearing for enclosing and supporting a rotary shaft, the radial foil bearing comprising:

a cylindrical top foil disposed so as to face the rotary shaft;
a back foil disposed on a radially outer side of the top foil; and
a cylindrical bearing housing accommodating the top foil and the back foil,
wherein the back foil is formed in a cylindrical shape using at least one back foil piece,
wherein the back foil piece includes peak portions and valley portions which are alternately formed in a circumferential direction of the top foil and is fixed to the bearing housing at an intermediate portion between both end portions of the back foil piece in a circumferential direction of the back foil piece, and
edges on both sides of the back foil piece in an axial direction of the radial foil bearing are fixed to the bearing housing.

2. The radial foil bearing according to claim 1,
wherein the back foil is formed in a cylindrical shape using back foil pieces which are disposed in line in the circumferential direction of the top foil.

3. The radial foil bearing according to claim 1,
wherein the back foil piece is fixed to the bearing housing using spot welding.

4. The radial foil bearing according to claim 1, wherein only the edges on both sides of the back foil piece in the axial direction are fixed to the bearing housing.

5. The radial foil bearing according to claim 1, wherein edges on both sides of a valley portion of the back foil piece in the axial direction are provided with notches, and
a locking member is engaged with the notches of the back foil piece and with the bearing housing so that the back foil piece is fixed to the bearing housing.

* * * * *